Apr. 3, 1923.

E. E. WICKERSHAM.
TRACTOR CONSTRUCTION.
FILED AUG. 22, 1918.

INVENTOR.
*Elmer E. Wickersham*
BY
*Strong & Townsend*
ATTORNEYS

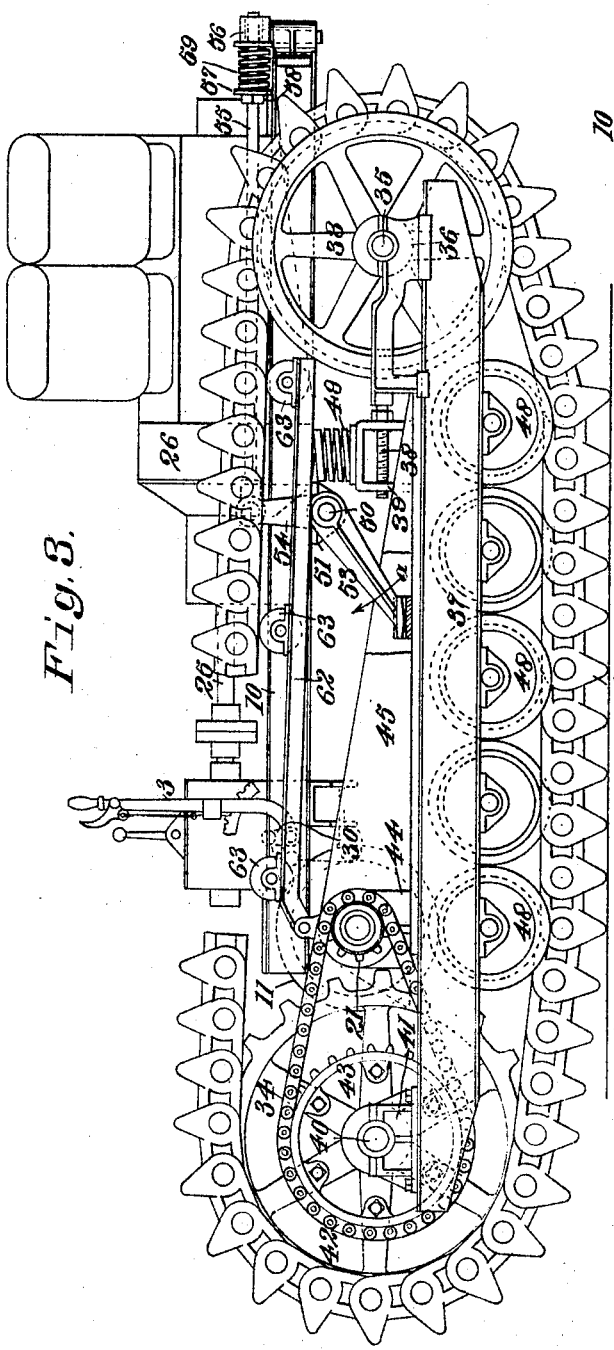

Patented Apr. 3, 1923.

1,450,469

UNITED STATES PATENT OFFICE.

ELMER E. WICKERSHAM, OF STOCKTON, CALIFORNIA, ASSIGNOR TO THE HOLT MANUFACTURING COMPANY, OF STOCKTON, CALIFORNIA, A CORPORATION OF CALIFORNIA.

TRACTOR CONSTRUCTION.

Application filed August 22, 1918. Serial No. 250,931.

*To all whom it may concern:*

Be it known that I, ELMER E. WICKERSHAM, a citizen of the United States, residing at Stockton, in the county of San Joaquin and State of California, have invented a new and useful Improvement in Tractor Constructions, of which the following is a specification.

This invention relates to a tractor of the self-laying track type and more particularly to the suspension means therefor.

The suspension means is of the type shown and described in the co-pending application of Henry J. Stegeman, Serial No. 261,615, filed Nov. 8th, 1918, and comprises four points, two of which are floating points, the two floating points being equalized.

The object of the invention is to simplify and improve the construction and operation of suspension means of this type, and particularly to render the equalizing connections resilient.

In carrying out the present invention it is contemplated to use a one-piece frame, at the rear of which is mounted a driving axle and transmission. Track units are pivotally suspended from the opposite ends of this axle, and are further connected in a resilient manner to the forward ends of the vehicle frame, at two points by novel resilient equalizing means.

The invention is illustrated by way of example in the accompanying drawings, in which—

Figure 1 is a view in plan illustrating the main frame, and the running gear of the tractor.

Fig. 2 is a view in front elevation disclosing the equalizer connection at the forward end of the main frame.

Fig. 3 is a view in side elevation illustrating the completely assembled tractor.

Fig. 4 is a view in vertical section through the transmission as seen on line 4—4, Fig. 5.

Fig. 5 is a view through the transmission in vertical section as seen on line 5—5, Fig. 4.

Fig. 6 is a fragmentary view in section illustrating the pivotal mounting of the roller truck frames from the axle housing and the support of the live axle therein.

In the drawings, 10 indicates a main frame. This frame is formed of a single piece of channel iron bent to provide parallel side rails and a transverse connection end portion. The frame thus formed is U-shaped, and its terminating ends extend rearwardly over a transmission unit 11. These ends are provided with bearings 12 by means of which an axle housing 13 is supported. This housing is substantially cylindrical and tubular and extends outwardly and oppositely from a central gear case housing 14. The gear case encloses a worm wheel 15, within which are supported differential bevel gear pinions 16. These pinions project outwardly from the opposite sides of the worm wheel and are in mesh with complementary bevel gears 17 and 18. These gears are fixed upon the adjacent ends of live axles 19 and 20. The axles in turn extend outwardly through the tubular axle housing 13, and are fitted at their outer ends with driving sprockets 21. Suitable antifriction bearings 22 are positioned at points along the axle housings to rotatably support the axle members. The worm wheel 15 is driven by a worm gear 23, which is fixed to a driving shaft 24. This shaft extends longitudinally of the tractor and is rotatably supported within the gear case. A series of spur driving gears are mounted upon this shaft, and may be engaged by similar gears upon a parallel propeller shaft 25. By this gear arrangement variable speeds may be imparted to the worm wheel. The propeller shaft is fitted with a coupling and extends forwardly to connect with an explosive engine 26, which is suitably suspended at the forward end of the main frame.

In view of the fact that the vehicle may be guided by variable driving of the track units 26 and 27, it is desirable to optionally vary the rotating speeds of the live axles 19 and 20. This is accomplished by securing a brake drum 28 upon each of the axles as indicated in Fig. 4. These drums are provided with brake bands 29, which may be operated by bell cranks 30. The bell cranks are enclosed within the transmission case, and are separately operable by hand levers 31. Contraction of either of the brake bands will affect the differential gear mechanism, including gear pinion 16 and the gears 17 and 18 to retard the brake drum on one side of the worm gear 15 and accelerate the speed of the drum and shaft upon the opposite side. The degree of friction applied to the brake drums will determine the relative speed ratios of the two live axles, and thus alter the course of the vehicle accordingly.

The track units 26 and 27 include a link track 32, which passes around the front idler wheels 33 and a rear driving sprocket 34. The front idler wheels are carried by a shaft 35, which is supported at its opposite ends within bearings 36. These bearings are connected by a yoke, and are slidably mounted upon flanged extensions of the roller truck frames 37. The yokes are fitted with tightening bolts 38, which may be adjusted with relation to a fixed standard 39 carried by the truck roller frame. The driving sprocket 34 of each truck is provided with an axle 40, which is mounted within the fixed bearings 41, upon the rear portions of the roller frames. These sprockets are driven by final drive chains 42, which pass around the driving sprockets 21 and driven sprockets 43. These last named sprockets are bolted to the spokes of the large track chain sprockets 34.

The rear ends of the roller truck frames are pivotally supported upon the outer extensions of the axle housings 13 by means of bearings 44. These bearings extend upwardly from the horizontal faces of the roller frames and encompass the axle housings in the manner shown in Fig. 6. Due to this arrangement the roller frames will be free to swing vertically in relation to the axis of the live axles 19 and 20, thus maintaining the axle housing and the sprocket shaft 40 in alignment, and causing the latter to swing concentrically thereto.

The bearing member 44 is formed as a part of a top casting 45, to which side channels 46 and 47 are fastened to form the roller truck frame. These channel irons carry individual bearings for the axles by load supporting rollers 48, which bear upon the lower run of the chain track.

The forward end of the main frame is supported upon the roller frames by an equalizing mechanism. This structure provides a four-point suspension for the forward end of the main frame and also acts to equalize the movement of the main frame in relation to the movement of the two roller frames. This structure comprises a transverse shaft 50, which extends across beneath the main frame and is held in the bearings 51. The opposite ends of this shaft are provided with pressure arms 52 and 53 which freely oscillate thereon. These arms extend rearwardly and rest upon bearing pads formed upon the frame castings 45. The ends of the arms are preferably curved to provide an arcuate bearing as they press against their seats.

It will be understood that the ends of the pressure arms are not positively connected to the roller frames. The hubs of the arms 52 and 53 carry upwardly extending levers 54, which extend upwardly at opposite sides of the main frame, and are there pivotally connected to pressure rods 55. These rods extend forwardly along the opposite sides of the main frame, and pass through openings in the opposite ends of the equalizer bar 56. Collars 57 are mounted upon the rods 55, and are adjustably held by the lock nuts 58. Interposed between these collars and the ends of the equalizer bar 56 are helical springs 59. The openings in the bar through which the ends of the rods extend are of sufficient diameter to allow the bar to swing horizontally upon its axis without binding. The bar 56 is pivotally supported above a bearing 60 by means of a central pivot pin 61. This pin extends vertically and its axis is coincident with the longitudinal axis of the vehicle.

In order to properly support the upper run of the track chains a supporting arm 62 is provided. This arm rests at its forward end upon compression springs 49, which are carried by the standards 39. The rear ends of the carriers 62 are pivoted to the upper portion of the frame bearings 44, and carry a series of spaced supporting rollers 63. The track chain passes along these rollers as they are resiliently supported by the springs 49.

In driving the tractor herein described power is transmitted to the traction mechanism case 14 through the propeller shaft 25. Appropriate reduction of speed may be had by shifting the gears in the transmission casing and thereafter driving the shaft 24. This last named shaft operates the worm gear 23, and thus rotates the worm wheel 15. When the vehicle is being driven straight ahead, and there are no unequal obstructions for the separate tracks as they pass along the roadway, the differential mechanism will act to drive the tracks at uniform speed. In the event that the vehicle is to be turned, brake pressure may be applied to one of the brake drums 28 by a corresponding lever 31, and the shaft upon which the drum rotates is thus retarded. The reduction in speed of this shaft will produce a proportionate acceleration in the speed of the opposite shaft, and thus cause the tracks to move an unequal lineal speed.

As the vehicle passes along the roadway the truck units will be constantly assuming different relations to each other as they swing around the axis of the live driving axles. The upward swinging action of one truck will produce movement of a corresponding pressure arm 53 in the direction of arrow a in Fig. 3. This will swing the arm around the shaft 50, and cause the corresponding lever 54 to swing forwardly. The connecting pressure rod 55 will also swing forwardly and compress its spring 59.

After this spring has been further compressed the equalizer bar 56 will swing in the direction of arrow $b$, and its opposite end will move rearwardly to swing the opposite pressure arm 52 downwardly. This downward pressure will act upon the opposite frame member to elevate the main frame. Due to this arrangement the maximum vibration imparted to the main frame will be substantially half the difference in elevation between the two roller frames. This arrangement will also provide a continuous resilient support for the forward ends of the frames by means of the springs 59.

By pivoting the bar 56 on the front end of the main frame, it becomes possible to lower the elevation of said frame. This is of importance in small tractors, such as are intended for orchard work and the like.

It will thus be seen that the tractor construction here disclosed is decidedly simple, will require a comparatively small amount of machine work, and insures that an inexpensive tractor may be built having a variable speed steering control four-point suspension and equalizing mechanism, and other desirable features, which will insure that the track elements will readily conform to the contour of the roadway without imparting excessive vibration to the main frame.

Having thus described my invention, what I claim and desire to secure by Letters Patent is:

1. In a tractor, a main frame, a self-laying track unit at each side thereof pivotally connected to the main frame for rocking movement in a vertical plane and equalizing suspension means for the main frame remote from said pivoted connections comprising an equalizer bar pivoted centrally on a vertical pivot to the forward end of the main frame, a shaft extending transversely of the main frame at the rear of said equalizer bar, a bell crank lever journaled on each end of the shaft and having a connection with the adjacent track laying unit, and a rod extending along each side of the main frame for operatively connecting a bell crank lever with the adjacent end of the equalizer bar.

2. In a tractor, a one-piece main frame, a transmission mechanism bolted to the rear end of said main frame and extending oppositely therefrom, roller truck frames pivoted around the lateral axis of said mechanism, and yieldable frame suspension means at the forward end of the main frame adapted to support the main frame upon the roller frames in a manner to equalize the movement of the roller frames.

3. In a track laying tractor, the combination of a main frame, two track frames located at opposite sides thereof and pivoted thereto, and a spring suspension for the main frame remote from said pivotal connection comprising two rockers each having two arms, means connecting an arm of each rocker to the associated track frame, and two spring means which are connected respectively to the other arms of said rockers and with opposite ends of said equalizer bar.

4. In a tractor, a main frame, a pair of roller truck frames at the opposite sides thereof, load supporting connections between each truck frame and the main frame near the rear thereof permitting rocking movement of the truck frames in a vertical plane, and an equalizer bar pivotally mounted at the forward end of the main frame on a vertical axis for rocking movement in a horizontal plane, and yieldable operative connections between the equalizer bar and the truck frames.

5. In a tractor construction, a one-piece main frame, a transmission secured to the rear thereof, and having axles extending outwardly from the opposite sides thereof, roller frames pivotally supported around the transverse axis of said transmission, equalizer means connecting the main frame to the forward ends of the truck rollers, driving sprockets fixed to the outer ends of the transmission axles, and driving chains leading from said sprockets to drive self-laying track sprockets carried by rearwardly projecting ends of the roller frames and adapted to swing radially in relation to the transmission axis.

6. In a tractor construction having separate roller truck frames, and a main frame pivoted at one end thereof, an equalizer mechanism interposed between the forward ends of the roller frames and the main frame comprising a compensating bar centrally pivoted on a vertical pivot to the front end of the main frame, pressure arms carried by the main frame and resting upon the opposite roller frames, and connections between said pressure arms and the equalizer bar whereby a swinging movement of one arm will produce a reverse swinging movement of the other.

7. In a tractor construction having separate roller truck frames, and a main frame pivoted at one end thereof, an equalizer mechanism interposed between the forward ends of the roller frames and the main frame comprising a compensating bar centrally pivoted to the main frame, pressure arms carried by the main frame and resting slidably upon the opposite roller frames, and yieldable connections between said said pressure arms and the equalizer bar whereby a swinging movement of one arm will produce a reverse swinging movement of the other.

8. In a tractor construction, a one-piece U-shaped main frame, a transmission housing secured beneath the rear terminating ends of said frame, and extending outwardly therefrom, roller truck frames pivotally supported upon said outwardly extending ends of the transmission housing, chain track driving sprockets mounted rearwardly of the housing upon the roller frames, sprocket chains for driving said chain track sprockets from the transmission included within the housing, and compensating means at the forward end of said main frame whereby relative movement of the roller frames will be compensated in the resultant movement of the main frame.

9. In a tractor construction having separate roller truck frames, and a main frame pivoted at one end thereof, an equalizer mechanism interposed between the forward ends of the roller frames and the main frame comprising a compensating bar centrally pivoted to the main frame, pressure arms carried by the main frame and operatively associated with the opposite roller frames, and yieldable connections between said pressure arms and the equalizer bar whereby a swinging movement of one arm will produce a reverse swinging movement of the other.

10. In a track laying tractor, the combination of a main frame, two track frames located at opposite sides thereof and pivoted thereto, and a spring suspension for the main frame remote from said pivotal connection, comprising two rockers each having two arms, an arm of each rocker being operatively associated with the track frame, an equalizer bar pivoted to the main frame, and two spring means which are connected respectively to the other arms of said rockers and with opposite ends of said equalizer bar.

In testimony whereof I have hereunto set my hand in the presence of two subscribing witnesses.

ELMER E. WICKERSHAM.

Witnesses:
JOHN H. HERRING,
W. W. HEALEY.